US011397831B2

(12) United States Patent
Lowenberg et al.

(10) Patent No.: US 11,397,831 B2
(45) Date of Patent: *Jul. 26, 2022

(54) METHOD AND SYSTEM FOR DOUBLE ANONYMIZATION OF DATA

(71) Applicant: MASTERCARD INTERNATIONAL INCORPORATED, Purchase, NY (US)

(72) Inventors: Todd Christian Lowenberg, Redding, CT (US); Andrew S. Reiskind, Armonk, NY (US); Curtis Villars, Chatham, NJ (US); Rohit Chauhan, Somers, NY (US); JoAnn C. Stonier, Pelham, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 16/990,374

(22) Filed: Aug. 11, 2020

(65) Prior Publication Data
US 2020/0372182 A1    Nov. 26, 2020

Related U.S. Application Data

(63) Continuation of application No. 15/708,349, filed on Sep. 19, 2017, now Pat. No. 10,769,305.
(Continued)

(51) Int. Cl.
*H04L 29/06*    (2006.01)
*G06F 21/62*    (2013.01)
(Continued)

(52) U.S. Cl.
CPC ........ *G06F 21/6254* (2013.01); *G06F 21/602* (2013.01); *G06Q 20/10* (2013.01);
(Continued)

(58) Field of Classification Search
CPC ... G06F 21/602; G06F 21/6254; G06Q 20/10; G06Q 20/382; G06Q 20/3827; G06Q 20/383; G06Q 2220/10
See application file for complete search history.

(56) References Cited

U.S. PATENT DOCUMENTS 9,123,054 B1    9/2015  Villars et al.
9,246,686 B1 *  1/2016  Holland ................. H04L 63/12
(Continued)

FOREIGN PATENT DOCUMENTS

WO    2014082749 A1    6/2014

OTHER PUBLICATIONS

Tuomas Aura et al., Scanning Electronic Documents for Personally Identifiable Information, Oct. 2006, ACM, pp. 41-50. (Year: 2006).*
(Continued)

*Primary Examiner* — Luu T Pham
*Assistant Examiner* — Fahimeh Mohammadi
(74) *Attorney, Agent, or Firm* — Panitch Schwarze Belisario & Nadel LLP

(57) ABSTRACT

A method for double anonymization of data includes: receiving, by a first computing system, a plurality of first data sets, each including a set identifier and personally identifiable information; anonymizing, by the first computing system, each of the first data sets, by hashing the set identifier included in each first data set to obtain a hashed identifier and deidentifying the personally identifiable information; transmitting, by the first computing system, the plurality of anonymized first data sets to a second computing system, wherein the second computing system is distinct and separate from the first computing system; anonymizing, by the second computing system, each of the anonymized first data sets, by hashing the hashed identifier to obtain a double-hashed identifier; and storing, in the second computing
(Continued)

system or a third separate and distinct computing system, the plurality of double anonymized first data.

14 Claims, 6 Drawing Sheets

Related U.S. Application Data

(60) Provisional application No. 62/397,828, filed on Sep. 21, 2016.

(51) Int. Cl.
  *G06Q 20/38* (2012.01)
  *G06F 21/60* (2013.01)
  *G06Q 20/10* (2012.01)

(52) U.S. Cl.
  CPC ......... *G06Q 20/382* (2013.01); *G06Q 20/383* (2013.01); *G06Q 20/3827* (2013.01); *G06Q 2220/10* (2013.01)

(56) References Cited

U.S. PATENT DOCUMENTS

| | | | | |
|---|---|---|---|---|
| 9,703,967 | B1* | 7/2017 | Kothari | H04L 63/0407 |
| 2003/0126436 | A1* | 7/2003 | Greenberg | H04L 63/083 |
| | | | | 713/168 |
| 2010/0027780 | A1 | 2/2010 | Jung et al. | |
| 2011/0060905 | A1* | 3/2011 | Stack | G06Q 30/02 |
| | | | | 713/167 |
| 2013/0024242 | A1 | 1/2013 | Villars et al. | |
| 2014/0004816 | A1* | 1/2014 | Udeshi | H04W 52/0258 |
| | | | | 455/405 |
| 2014/0032922 | A1* | 1/2014 | Spilman | G06F 21/602 |
| | | | | 713/184 |
| 2014/0122442 | A1* | 5/2014 | Takenouchi | H04L 63/0421 |
| | | | | 707/687 |
| 2014/0278972 | A1 | 9/2014 | Yonebahashi et al. | |
| 2014/0380498 | A1* | 12/2014 | Toyoda | G06F 21/62 |
| | | | | 726/27 |
| 2015/0324590 | A1* | 11/2015 | Krten | G06F 21/14 |
| | | | | 726/26 |
| 2016/0117689 | A1 | 4/2016 | Oshry et al. | |
| 2016/0140544 | A1* | 5/2016 | Howe | G06Q 20/383 |
| | | | | 705/74 |
| 2016/0342812 | A1* | 11/2016 | Lynch | H04W 12/02 |
| 2016/0371684 | A1* | 12/2016 | Abbott | H04L 63/0421 |

OTHER PUBLICATIONS

Olivia Angiuli et al., How to De-identify Your Data, Sep. 2015, ACM, pp. 1-20. (Year: 2015).*
Amin Milani Fard et al., An Effective Clustering Approach to Web Query Log Anonymization, Jul. 26-28, 2010, IEEE, pp. 1-11. (Year: 2010).*
Nai-Wei Lo et al., Hash-based Anonymous Secure Routing Protocol in Mobile Ad Hoc Networks, May 24-26, 2015, IEEE, pp. 55-62. (Year: 2015).*
Written Opinion dated Jul. 1, 2021, by the Intellectual Property Office of Singapore in corresponding Singapore Patent Application No. 11201902450S. (6 pages).
Fard, et al., "An Effective Clustering Approach to Web Query Log Anonymization", IEEE, Jul. 26-28, 2010, pp. 1-11.
Lo, et al., "Hash-based Anonymous Secure Routing Protocol in Mobile Ad Hoc Networks", IEEE, May 24-26, 2015, pp. 55-62.
Angiuli, et al., "How to De-identify Your Data", ACM, Sep. 2015, pp. 1-20.
Notification of Transmittal of the International Search Report and the Written Opinion of the International Searching Authority (Forms PCT/ISA/220, PCT/ISA/210 and PCT/ISA/237) dated Dec. 5, 2017, by the European Patent Office in corresponding International Application No. PCT/US2017/052147. (13 pages).
Aura, et al., "Scanning Electronic Documents for Personally Identifiable Information", ACM, Oct. 2006, pp. 41-50.

* cited by examiner

US 11,397,831 B2

METHOD AND SYSTEM FOR DOUBLE ANONYMIZATION OF DATA

FIELD

The present disclosure relates to the double anonymization of data, specifically the use of multiple anonymization processes on data, performed by separate and distinct computing systems, to ensure the highest level of privacy while retaining the usability of the anonymized data.

BACKGROUND

Data is gathered on individuals and other entities every single day. In many cases, individuals may be uncomfortable with having data associated with them being made available to other entities or used in particular ways. In such instances, systems have been developed to anonymize the data, such that personally identifiable data that is identifiable of the associated individual may be removed, encrypted, hashed, or otherwise obscured such that the non-personally identifiable data may be freely used without sacrificing the privacy of the individuals. One such method for anonymizing data that retains individual privacy and security is described in U.S. Pat. No. 9,123,054, entitled "Method and System for Maintaining Privacy in Scoring of Consumer Spending Behavior," by Curtis Villars, et al., which is herein incorporated by reference in its entirety.

While such methods may be useful for anonymizing data for various usages, in some cases, these existing processes may not be enough. For instance, some governmental agencies and other entities may require even greater privacy and security than is currently available. In addition, individuals and other entities have a significant interest in ensuring that their data is anonymized as much as possible, for their own personal security and peace of mind. Thus, there is a need for a technological solution to provide for even greater anonymization of data such that the data does not contain any personally identifiable information and still maintains a high level of security and privacy while not sacrificing usability.

SUMMARY

The present disclosure provides a description of systems and methods for the double anonymization of data. The systems and methods discussed herein use a plurality of different computing systems that are separate and distinct from one another that each perform anonymization processes, to ensure that the data is sufficiently anonymized, while also ensuring that neither computing system retains, or in some cases is ever in contact with, personally identifiable information. In some cases, the double anonymized data may even be stored and hosted by a third computing system, further increasing the privacy and security provided by the systems and methods discussed herein.

A method for double anonymization of data includes: receiving, by a receiving device of a first computing system, a plurality of first data sets, each first data set including at least a set identifier and including personally identifiable information; anonymizing, by the first computing system, each of the first data sets, wherein anonymizing includes at least replacing the set identifier included in each first data set with a hashed identifier and deidentifying the personally identifiable information, where the hashed identifier is generated via the application of one or more hashing algorithms to at least the corresponding set identifier; electronically transmitting, by a transmitting device of the first computing system, the plurality of anonymized first data sets to a receiving device of a second computing system, wherein the second computing system is distinct and separate from the first computing; anonymizing, by the second computing system, each of the anonymized first data sets, wherein anonymizing includes at least replacing the hashed identifier with a double-hashed identifier, the double-hashed identifier being generated via application of one or more hashing algorithms to at least the corresponding hashed identifier; and storing in the second computing system or a third separate and distinct computing system, the plurality of double anonymized first data sets.

A system for double anonymization of data includes a first computing system; and a second computing system, wherein first computing system is configured to receive, by a receiving device of the first computing system, a plurality of first data sets, each first data set including at least a set identifier and including personally identifiable information, anonymize each of the first data sets, wherein anonymizing includes at least replacing the set identifier included in each first data set with a hashed identifier and deidentifying the personally identifiable information, where the hashed identifier is generated via the application of one or more hashing algorithms to at least the corresponding set identifier, and electronically transmit, by a transmitting device of the first computing system, the plurality of anonymized first data sets to a receiving device of a second computing system, wherein the second computing system is distinct and separate from the first computing system, and the second computing system is configured to anonymize each of the anonymized first data sets, wherein anonymizing includes at least replacing the hashed identifier with a double-hashed identifier, the double-hashed identifier being generated via application of one or more hashing algorithms to at least the corresponding hashed identifier, wherein the second computing system or a third separate and distinct computing system is configured to store the plurality of double anonymized first data sets.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
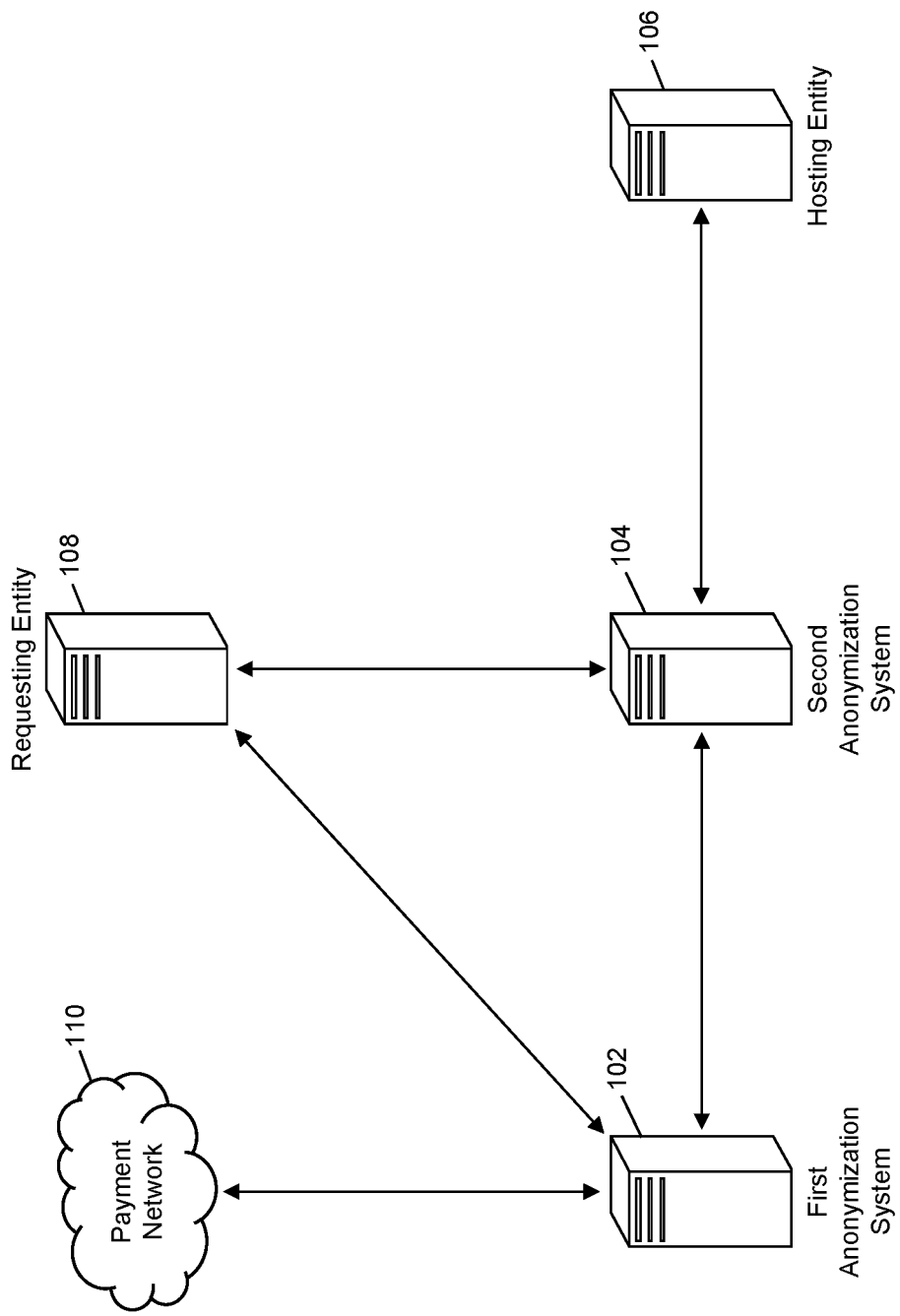
FIG. 1 is a block diagram illustrating a high level system architecture for the double anonymization of data in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the first anonymization system 102 and second anonymization system 104 do not possess any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the first anonymization system 102 and second anonymization system 104 may not possess the PII or be able to decrypt the encrypted PII. Additional information regarding the anonymization of PII can be found in the United Kingdom's Information Commissioner's Office's Anonymisation: Managing Data Protection Risk Code of Practice, which is herein incorporated by reference in its entirety.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Double Anonymization of Data

FIG. 1 illustrates a system 100 for the double anonymization of data to provide a significantly high level of privacy and security to associated individuals while retaining usability of the data.

The system 100 may include a first anonymization system 102. The first anonymization system 102 may be comprised of one or more processing servers, such as processing servers 200 discussed in more detail below, and be configured to perform a first anonymization process for data received thereby. The first anonymization system 102 may receive a plurality of data sets that are to be anonymized, where each data set may include a set identifier and personally identifiable information. The first anonymization process may include the deidentification of each data set to remove or otherwise obscure the personally identifiable information, and the replacement of the set identifier with a hashed value.

The set identifier may be a unique value associated with the data set used for identification thereof. For instance, the set identifier may be a user identification number, e-mail address, username, telephone number, registration number, or other suitable value. Replacement of the set identifier with a hashed value may involve the hashing of the set identifier via the application of one or more hashing algorithms to the set identifier by the first anonymization system 102. In an exemplary embodiment, the one or more hashing algorithms may include an algorithm that is collision resistant, such that no two hash values ever generated thereby should be equivalent, such as the Secure Hash Algorithm 2. In some embodiments, the first anonymization system 102 may be configured to discard the set identifier upon generation of the corresponding hashed identifier. For instance, the first anonymization system 102 may be configured to hash the set identifiers immediately upon receipt so that the set identifiers are not explicitly received and are never retained.

Deidentification of the personally identifiable information may involve the use of processes designed to remove, disguise, or otherwise obscure the personally identifiable information included in a data set. In a first example, the first anonymization system 102 may be configured to replace personally identifiable data values in a data set with variables to disguise the underlying data values. For instance, if the data sets include demographic characteristics for individuals, with the characteristics including the age group for each individual, each of the age groups may be replaced by a corresponding variable (e.g., 25 and under replaced with "A," 26-35 replaced with "B," 36-45 replaced with "C," etc.). The first anonymization system 102 may be configured to disguise all of the personally identifiable information in each data set, and, in some instances, may disguise all of the data values in a data set. In some embodiments, the replacement of the set identifier with the hashed identifier may comprise the deidentification of the personally identifiable information for the data sets. In some cases, the first anonymization system 102 may enable individuals to opt-out from the use of their data in the methods discussed herein.

In some instances, the first anonymization system 102 may be comprised of a plurality of different processing servers, which may be organized into separate computing environments for additional privacy and security in the deidentification and anonymization of the data sets. Methods for the deidentification of a data set using multiple computing environments in a single system are discussed in more detail in U.S. Pat. No. 9,123,054, entitled "Method and System for Maintaining Privacy in Scoring of Consumer Spending Behavior," by Curtis Villars, et al., which is herein incorporated by reference in its entirety. In some cases, the first anonymization system 102 may utilize a hardware security module in the operation of one or more of the functions discussed herein.

Once the first anonymization system 102 has anonymized the data sets, the first anonymization system 102 may electronically transmit the anonymized data sets to a second anonymization system 104 for the performing of a second anonymization process thereon. The second anonymization system 104 may be a distinct and separate computing system, which may be comprised of one or more processing servers, such as processing servers 200 discussed in more detail below. In an exemplary embodiment, the second anonymization system 104 may be controlled by a separate entity from an entity controlling the first anonymization system 102, such as both systems being operated by different business entities. In such an embodiment, the entity controlling one anonymization system may thus not have control over the other anonymization system. In other embodiments, the entities controlling the anonymization systems may be in a partnership or have any other suitable type of agreement where the anonymization systems may cooperate, but where the anonymization systems are operated independently. In some cases, the operating infrastructure for the first anonymization system 102 and second anonymization system 104 may be based on, and compliant with, applicable rules and regulations of the jurisdiction where the systems are located. This includes separating the first anonymization system 102 from the second anonymization system 104 potentially both physically and/or into separate and independent legal entities. Independence will be determined legal definitions within the relevant jurisdiction(s), particularly with respect to those laws that govern privacy of people and their data. This independence can be achieved through minority owned subsidiaries, a vendor hosting company, a vendor licensee, and/or third party companies. Another mode is whether the second anonymization system 104 is held by a trust company, which would allow the entity holding the first anonymization system 102 to be a beneficiary of such a trust. The trust structure would have the benefit of allowing for multiple first anonymization systems 102, each held by a different trust beneficiary, who could provide the data to a second anonymization system 104 held by the trust. In some embodiments, the first anonymization system 102 may discard the data values included in each data set following transmission to the second anonymization system 104.

The second anonymization system 104 may receive the anonymized data sets and may be configured to perform a second anonymization process on the data sets, for double anonymization of the data. The second anonymization process may include at least the replacement of the hashed identifiers with double-hashed identifiers. The double-hashed identifiers may be generated via the application of one or more hashing algorithms to the hashed identifiers included in each respective data set. In some embodiments, the same one or more hashing algorithms may be used as those used in generating the hashed identifiers. In other embodiments, the second anonymization system 104 may use at least one different hashing algorithm. In some cases, the one or more hashing algorithms may be collision resistant.

The second hashing of the set identifiers to generate the double-hashed identifiers may ensure that the first anonymization system 102 is unable to match the identifiers back to the original data as the first anonymization system 102 is unable to match the double-hashed identifiers to the hashed identifiers. Similarly, the second anonymization system 104, having never received any personally identifiable information or the original set identifiers, is unable to match the hashed identifiers or double-hashed identifiers to the set identifiers or personally identifiable information. After the double-hashed identifiers have been generated by the second anonymization system 104, the second anonymization system 104 may electronically transmit the double-anonymized data sets to a hosting entity 106. The hosting entity 106 may be a separate and distinct entity from the entities controlling the first anonymization system 102 and second anonymization system 104.

The hosting entity 106 may receive the double-anonymized data sets, which include the double-hashed identifiers and other data values. The hosting entity 106 may then store the data sets in one or more databases included therein or otherwise accessible thereby. In some embodiments, the second anonymization system 104 may discard the data values included in each data set, and, in some instances, may discard the hashed and double-hashed identifiers as well. In such embodiments, the only entity that may possess the data values, which are deidentified, may be the hosting entity 106, which may not receive or possess any set identifiers, hashed identifiers, or personally identifiable information.

In some embodiments, the second anonymization system 104 may operate as the hosting entity 106, such that the double-hashed identifiers and corresponding data is stored by the second anonymization system 104. In such embodiments, the second anonymization system 104 may be controlled by a separate entity, distinct from the entity controlling the first anonymization system. Also in such embodiments, the generation of the double-hashed identifiers may be performed as the anonymized data sets are received (e.g., by the second anonymization system 104 or by a third party computing system situated between the first anonymization system 102 and the second anonymization system 104), such that the second anonymization system does not receive or possess the hashed identifiers. In such an automated process the anonymization process may be established in manner so that it is unknown to any person, such as by the use of a randomized SALT during hashing.

To access the data, a requesting entity 108 may submit a data request to the first anonymization system 102 or the second anonymization system 104. The data request may include one or more set identifiers or hashed identifiers and may indicate one or more data values associated therewith that are requested. For instance, in the above example, the data request may be a list of twenty set identifiers for which each of the available demographic characteristics are requested. The first anonymization system 102 may generate the hashed identifier corresponding to a set identifier, if applicable, and may forward the hashed identifiers and requested data values to the second anonymization system 104. The second anonymization system 104 may generate the double-hashed identifiers for each of the hashed identifiers for internal use within the second anonymization system 104 and may query the hosting entity 106 for the corresponding data values. In some embodiments, the hosting entity 106 may provide an application programming interface (API) through which the second anonymization system 104 may query for data values. The second anonymization system 104 may receive the data values and provide to the requesting entity 108, which meet the selected anonymization criteria, which are controlled by the control layer. In some embodiments, to ensure the anonymity of the data, no set identifiers or personally identifiable information may be provided by the second anonymization system 104 to the requesting entity 108 or the first anonymization system 102. In some instances, the first anonymization system 102 and/or second anonymization system 104 may use one or more different hashing algorithms for each data request received from a requesting entity 108.

In some instances, where reidentification of the anonymized individuals may be allowed, the requesting entity 108 may be configured to match data values to a set identifier. In such instances, the requesting entity 108 may use the hashing algorithms used by the first anonymization system 102 and second anonymization system 104 to generate a double-hashed identifier for each set identifier for which data is requested. The requesting entity 108 may receive the data values and their corresponding double-hashed identifiers from the second anonymization system 104, and may then match the data values to set identifiers using the double-hashed identifiers. As a result, the requesting entity 108 may identify data values for set identifiers, which may include the usage or possession of personally identifiable information, without any of the first anonymization system 102, second anonymization system 104, or hosting entity 106 possessing personally identifiable information.

In some embodiments, the hosting entity 106 (e.g., or the second anonymization system 104 if being used to store the data values) may include a control layer. The control layer may be configured to enforce compliance with application rules, standards, regulations, etc. regarding the anonymization of data and availability thereto. The control layer may, for instance, be configured using a plurality of rules regarding the aggregation, anonymization, and availability of the data supplied to the first anonymization system 102. For example, the control layer may have a rule to ensure that data values obtained from the hosting entity 106 are identified from at least a predetermined number of data sets (e.g., demographic characteristics from a minimum of 25 people in a given zip code) that may also be aggregated, to ensure privacy of the associated individuals. In some cases, the control layer may utilize different rules for the data values being identified, for the number of data values and/or data sets being identified, for the requesting entity 108 requesting the data (e.g., a governmental agency may have different rules than a private party and different data types may have different rules), etc. In some cases, the control layer may be configured to perform additional processing of the identified data values. For instance, the control layer may match (e.g., explicitly or inferred) the data to outside data that is publicly or privately available (e.g., matching transaction data associated with a geographic location to public census data for that geographic location), may provide analytics of identified data values, may provide visualizations (e.g., illustrated maps or graphics, visualized comparisons, reports, etc.) of identified data values, or generate models of identified data values, such as for predictions of future data values.

The control layer may be configured to remove unique outliers in a data set as the data is loaded, including evaluating the need to perturb data by K-anonymity (e.g., are the segments of individual records big enough, such as ensuring five people had a transaction on a given day at a specific merchant) and L-anonymity (e.g., segments are not too unique, such as including at least 120 individuals), and, if there is a need to perturb data, perturbing the data to meet a specified segment size and required level of segment genericness. The control layer may also be configured to apply other data modification techniques to data that is loaded, such as data recoding (e.g., deidentifying columns in tables), rounding data to limit the uniqueness of the data, create micro-clusters (e.g., micro-segments) depending on the uniqueness of data and then creating a cluster identifier and removing the unique identifiers for all records in that cluster. The control layer may also test the sufficiency of anonymization measures with differential privacy analysis, including setting tolerances for differential privacy per data set.

In some embodiments, the data that is double anonymized in the system 100 may be transaction data. Transaction data may be data related to electronic payment transactions involving one or more individuals or entities, and may include, for example, primary account numbers, transaction amounts, transaction times, transaction dates, currency types, geographic locations, merchant identifiers, merchant names, merchant category codes, product data, merchant data, consumer data, offer data, reward data, loyalty data, etc. Transaction data may be captured by a payment network 110, which may be configured to process payment transactions using traditional methods and systems. The payment network 110 may capture the data, which may then be electronically transmitted to the first anonymization system 102 for double anonymization. In some embodiments, the payment network 110 may electronically transmit the transaction data via payment rails associated therewith. In some cases, the first anonymization system 102 may be a part of the payment network 110.

In some instances, the transaction data may be electronically transmitted in transaction messages. Transaction messages may be specially formatted data messages that are formatted pursuant to one or more standards governing the exchange of financial transaction messages, such as the International Organization of Standardization's ISO 8583 or ISO 20022 standards. A transaction message may include a message type indicator indicative of the type of message, such as an authorization request or authorization response, and a plurality of data elements, where each data element is configured to store transaction data for the related payment transaction. In some embodiments, a transaction message may also include one or more bitmaps, each configured to indicate the data elements included in the transaction message and the data stored therein.

In such embodiments, the first anonymization system 102 may receive transaction data where the primary account number in each transaction may be the set identifier and comprise the personally identifiable information. The first anonymization system 102 may hash the primary account numbers and provide the transaction data with the hashed primary account numbers to the second anonymization system 104 for double hashing. The double-hashed identifiers and the corresponding transaction data may then be forwarded on to the hosting entity 106 for storage. In such cases, a requesting entity 108, such as a financial institution in need of more information about an individual, may provide the primary account number for the transaction account to the first anonymization system 102. The first anonymization system 102 may hash the primary account number and provide the hashed number to the second anonymization system 104, which may generate the double-hashed identifier and provide it to the hosting entity 106 (e.g., via the API) and receive the transaction data in return. In cases where anonymity may be less of a concern, the second anonymization system 104 may provide the transaction data and double-hashed identifier to the requesting entity 108, which may verify that the double-hashed identifier matches the primary account number (e.g., by performing both hashes itself).

In some embodiments, the first anonymization system 102 and/or second anonymization system 104 may be configured to use a salt when performing the respective hashes. A salt may be a value that is combined with the value being hashed, in order to further obscure the value that is being hashed. For instance, if hashing algorithm or algorithms used by the first anonymization system 102 and second anonymization system 104 are the same, the first anonymization system 102 would be able to identify the double-hashed identifiers itself, which may compromise compliance with privacy and security regulations. However, the use of a salt value by the second anonymization system 104 that is not known to the first anonymization system 102 may ensure that the double-hashed identifiers cannot be identified by the first anonymization system 102. In such embodiments, a requesting entity 108 that is configured to match data values to personally identifiable information may be provided with salts used by the first anonymization system 102 and second anonymization system 104 to identify the double-hashed identifier for matching.

In some embodiments, the hosting entity 106 (e.g., or the second anonymization system 104, as applicable) may be configured to pool data values received from different anonymization systems and/or data sources. For instance, the hosting entity 106 may receive double-anonymized data sets from different second anonymization systems 104, or may receive multiple double-anonymized data sets from a single second anonymization system 104, such as in instances where the first anonymization system 102 may receive data from multiple sources. In such embodiments, the hosting entity 106 may pool the double-anonymized data sets such that the data from multiple data sets is available for querying via data requests from a requesting entity 108. For example, the hosting entity 106 may receive double-anonymized data sets comprised of transaction data for payment transactions as well as double-anonymized data sets comprised of demographic characteristics for individuals, where both data sets include a geographic location as one of the data values. In such an example, a requesting entity 106 may obtain data that includes both transaction data and demographic characteristics, matched via the geographic locations. In some cases, a control layer may have different rules for different data sets that are pooled, such that data values from one data set may be restricted for a requesting entity 108 or the data may be aggregated before being combined.

In some instances where data sets may be pooled, the hosting entity 106 (e.g., or second anonymization system 104, as applicable) may be configured to establish rules regarding revenue for data sources for pool data sets. For instance, in the above example, the data source for the transaction data may be provided with a different revenue share than the data source for the demographic characteristics. In such cases, the revenue shares may be decided upon agreement of the data sources, volume of contributed data sets, value of contributed data sets, rate of access of contributed data sets, etc. For example, the data source for the transaction data may receive a higher revenue share if the transaction data is access significantly more than the demographic characteristics.

The methods and systems discussed herein provide use double anonymization to provide for a higher level of privacy and security in data storage and identification than is provided in traditional systems. By using two separate and distinct entities to perform separate anonymization processes, and then storing the data in a third separate and distinct entity, it ensures that the second anonymization system 104 and hosting entity 106 both do not possess and could not potentially match any data to personally identifiable information. In addition, the anonymization process used by the first anonymization system 102 ensures that the only data obtained and potentially retained thereby is unable to be matched back to personally identifiable data, such that after the data has been received and anonymized, it cannot be matched to personally identifiable data except by an authorized third party, such as the requesting entity 108.

Processing Server

Figure 2:
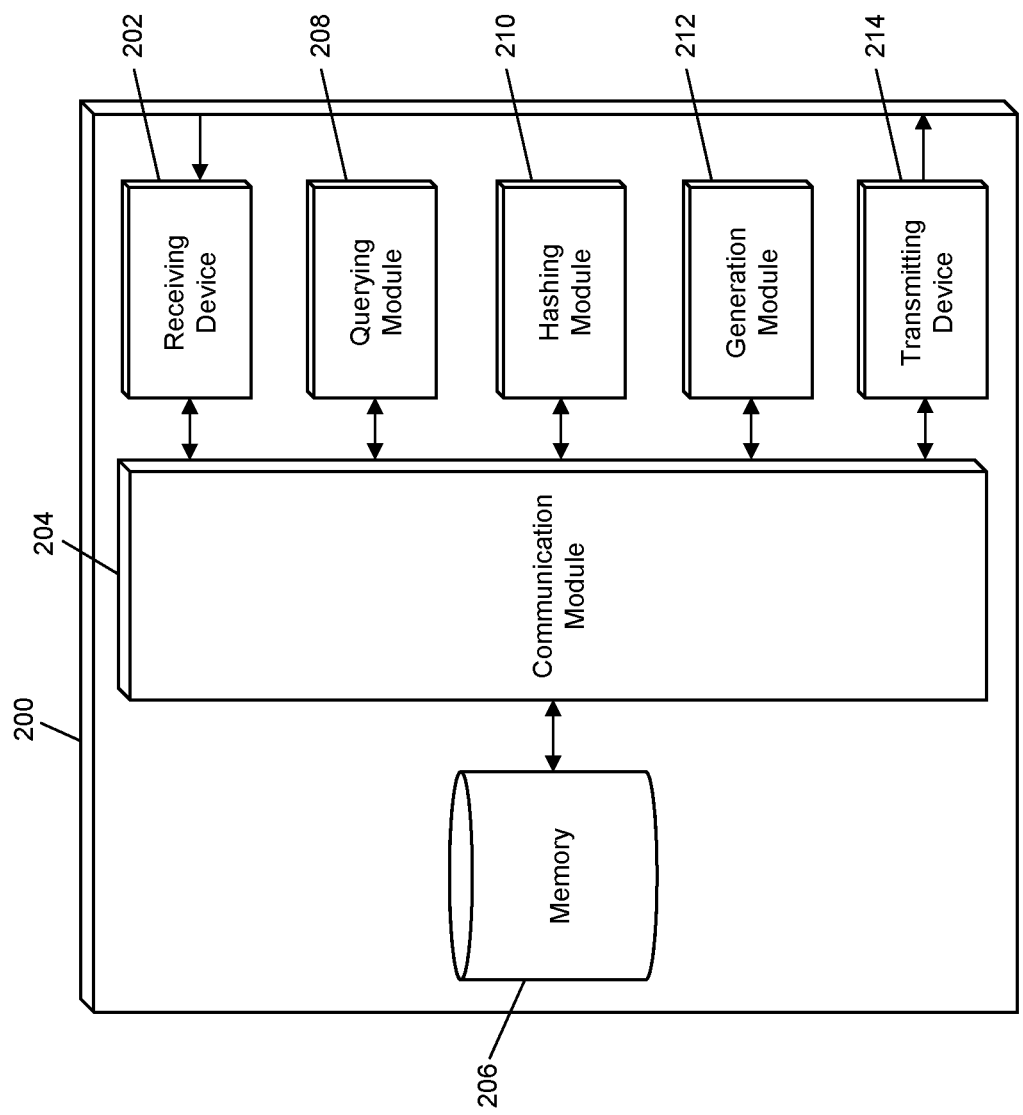
FIG. 2 is a block diagram illustrating a processing server configured to perform functions of the first and second anonymization systems of the system of FIG. 1 in accordance with exemplary embodiments.

FIG. 2 illustrates an embodiment of a processing server 200 in the system 100. It will be apparent to persons having skill in the relevant art that the embodiment of the processing server 200 illustrated in FIG. 2 is provided as illustration only and may not be exhaustive to all possible configurations of the processing server 200 suitable for performing the functions as discussed herein. For example, the computer system 600 illustrated in FIG. 6 and discussed in more detail below may be a suitable configuration of the processing server 200. The processing server 200 may be included in the first anonymization system 102 and/or second anonymization system 104 and be configured to perform the functions associated therewith. In some instances, the first anonymization system 102 and/or second anonymization system 104 may be comprised of multiple processing servers 200, which, in some instances, may be separated into separate and distinct computing environments to provide greater privacy and security through each entity's respective anonymization process.

The processing server 200 may include a receiving device 202. The receiving device 202 may be configured to receive data over one or more networks via one or more network protocols. In some instances, the receiving device 202 may be configured to receive data from first anonymization systems 102, second anonymization systems 104, hosting entities 106, requesting entities 108, payment networks 110, other processing servers 200, and other systems and entities via one or more communication methods, such as cellular communication networks, radio frequency, the Internet, local area networks, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by data providing entities, such as a payment network 110, which may be superimposed or otherwise encoded with a plurality of data sets, where each data set includes at least a set identifier, which may comprised or be accompanied by personally identifiable information, and additional data values. The receiving device 202 may also be configured to receive data signals electronically transmitted by other processing servers 200, which may be a part of a separate and distinct computing system (e.g., the first anonymization system 102 for a processing server 200 that is part of the second anonymization system 104), which may be superimposed or otherwise encoded with anonymized data sets, which may not include any personally identifiable information and may include hashed identifiers in place of set identifiers. The receiving device 202 may also be configured to receive data signals electronically transmitted by requesting entities 108, which may be superimposed or otherwise encoded with data requests, which may include set identifiers or hashed identifiers. The receiving device 202 may be further configured to receive data signals electronically transmitted by hosting entities 106, which may be superimposed or otherwise encoded with data values and corresponding double-hashed identifiers.

The processing server 200 may also include a communication module 204. The communication module 204 may be configured to transmit data between modules, engines, databases, memories, and other components of the processing server 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 200 and external components of the processing server 200, such as externally connected databases, display devices, input devices, etc. The processing server 200 may also include a processing device. The processing device may be configured to perform the functions of the processing server 200 discussed herein as will be apparent to persons having skill in the relevant art, such as a processor configured to execute smart contracts, such as via the execution of executable scripts associated therewith. In some embodiments, the processing device may include and/or be comprised of a plurality of engines and/or modules specially configured to perform one or more functions of the processing device, such as a querying module 208, hashing module 210, generation module 212, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 200 may also include a memory 206. The memory 206 may be configured to store data for use by the processing server 200 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the processing server 200 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The processing server 200 may include a querying module 208. The querying module 208 may be configured to execute queries on databases to identify and perform other actions related to information. The querying module 208 may receive one or more data values or query strings, and may execute a query string based thereon on an indicated database, such as the memory 206, to identify, modify, insert, update, etc. information stored therein. The querying module 208 may output identified information to an appropriate engine or module of the processing server 200 as necessary. The querying module 208 may, for example, execute a query on the memory 206 to identify hashing algorithms and, if applicable, salt values for use in hashing set identifiers or hashed identifiers as part of the processes of the first anonymization system 102 and second anonymization system 104.

The processing server 200 may also include a hashing module 210. The hashing module 210 may be configured to hash data for the processing server 200 for the generation of hash values. The hashing module 210 may receive data to be hashed as input, may generate hash values via the application of one or more hashing algorithms thereto, and may output the resulting hash value to another module or engine of the processing server 200. In some embodiments, the input may include the one or more hashing algorithms or indications thereof. In other embodiments, the hashing module 210 may be configured to identify the hashing algorithm(s) (e.g., in the memory 206 of the processing server 200) to be used. The hashing module 218 may be configured, for example, to generate hashed identifiers via application of one or more hashing algorithms to set identifiers (e.g., and a salt, if applicable), and to generate double-hashed identifiers via application of one or more hashing algorithms to hashed identifiers (e.g., and a salt, if applicable).

The processing server 200 may also include a generation module 212. The generation module 212 may be configured to generate data for use in the processing server 200 for performing the functions discussed herein. The generation module 212 may receive an instruction as input, may generate the data as instructed, and may output the generated data to another module or engine of the processing server 200. In some cases, the generation module 212 may be configured to use rules, algorithms, standards, or other data when generating data as requested. In such cases, the data may be included in the input provided to the generation module 212 or be identified thereby, such as by instructing the querying module 208 to query the memory 206 for the data. The generation module 212 may be configured to, for example, generate data messages that include hashed identifiers, double-hashed identifiers, and/or data values for electronic transmission to other computing systems and entities in the system 100.

The processing server 200 may also include a transmitting device 214. The transmitting device 214 may be configured to transmit data over one or more networks via one or more network protocols. In some instances, the transmitting device 214 may be configured to transmit data to first anonymization systems 102, second anonymization systems 104, hosting entities 106, requesting entities 108, payment networks 110, other processing servers 200, and other entities via one or more communication methods, such as cellular communication networks, radio frequency, the Internet, local area networks, etc. In some embodiments, the transmitting device 214 may be comprised of multiple devices, such as different transmitting devices for transmitting data over different networks, such as a first transmitting device for transmitting data over a local area network and a second transmitting device for transmitting data via the Internet. The transmitting device 214 may electronically transmit data signals that have data superimposed that may be parsed by a receiving computing device. In some instances, the transmitting device 214 may include one or more modules for superimposing, encoding, or otherwise formatting data into data signals suitable for transmission.

The transmitting device 214 may be configured to electronically transmit data signals to other processing servers 200 in the separate and distinct computing systems, which may be superimposed or otherwise encoded with data values and corresponding hashed identifiers. The transmitting device 214 may also be configured to electronically transmit data signals to hosting entities 108, such as may be superimposed or otherwise encoded with double-hashed identifiers and corresponding data values, or may be superimposed or otherwise encoded with data requests that include double-hashed identifiers, which may be transmitted via an API hosted by or otherwise associated with the hosting entity 106. The transmitting device 214 may be further configured to electronically transmit data signals to requesting entities 108 that are superimposed or otherwise encoded with double-hashed identifiers and the corresponding data values, such as may be transmitted in response to a received data request.

Process for Double Anonymization and Hosting of Data

Figure 3:
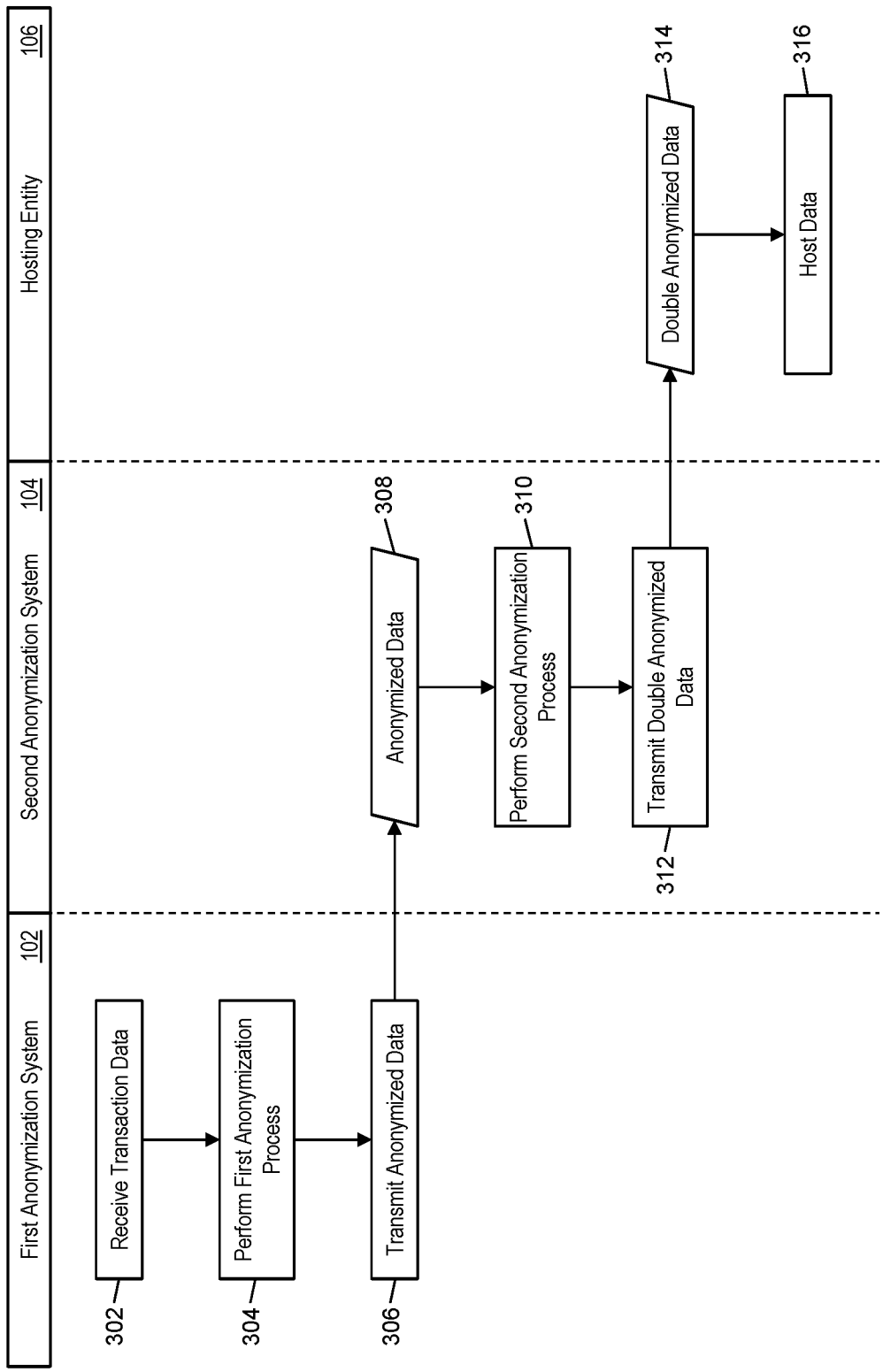
FIG. 3 is a flow diagram illustrating a process for the double anonymization of data and hosting thereof in the system of FIG. 1 in accordance with exemplary embodiments.

FIG. 3 illustrates a process for the double anonymization of transaction data via the use of the separate and distinct first anonymization system 102 and second anonymization system 104 and the hosting thereby by a separate and distinct hosting entity 106.

In step 302, a receiving device 202 of the first anonymization system 102 may receive a plurality of transaction data sets from a payment network 110, where each transaction data set includes data related to an electronic payment transaction including at least a primary account number as a set identifier and additional transaction data. In step 304, the hashing module 210 of the first anonymization system 102 may perform the first anonymization process. The first anonymization process may include the deidentification of personally identifiable information and the hashing of the set identifier. In the above example, the hashing of the set identifier may comprise the deidentification of the personally identifiable information. The hashing module 210 may apply one or more hashing algorithms to the set identifier (e.g., and a salt, if applicable) for each of the transaction data sets. In some instances, the first anonymization process may include the discarding of the set identifiers.

In step 306, the transmitting device 214 of the first anonymization system 102 may electronically transmit the anonymized transaction data sets, which does not include personally identifiable information and has the hashed identifiers in place of the set identifiers, to the second anonymization system 104. In some embodiments, step 306 may include the discarding of the transaction data sets or the transaction data included therein. In step 308, a receiving device 202 of the second anonymization system 104 may receive the anonymized transaction data sets from the first anonymization system 102. In step 310, a hashing module 210 of the second anonymization system 104 may perform the second anonymization process. The second anonymization process may include the replacing of the hashed identifier with a double-hashed identifier, generated via the application of one or more hashing algorithms to the hashed identifier included in the anonymized transaction data set (e.g., and a salt, if applicable) for each of the anonymized transaction data sets.

In step 312, a transmitting device 214 of the second anonymization system 104 may electronically transmit each of the double-anonymized transaction data sets to the hosting entity 106 via a suitable communication network and method. In some embodiments, step 312 may include the discarding of the anonymized transaction data sets or the transaction data included therein. In step 314, the hosting entity 106 may receive the double anonymized transaction data sets. In step 316, the hosting entity 106 may host the double anonymized data, having the transaction data stored with the corresponding double-hashed identifiers.

Process for Usage of Double Anonymized Data

Figure 4:
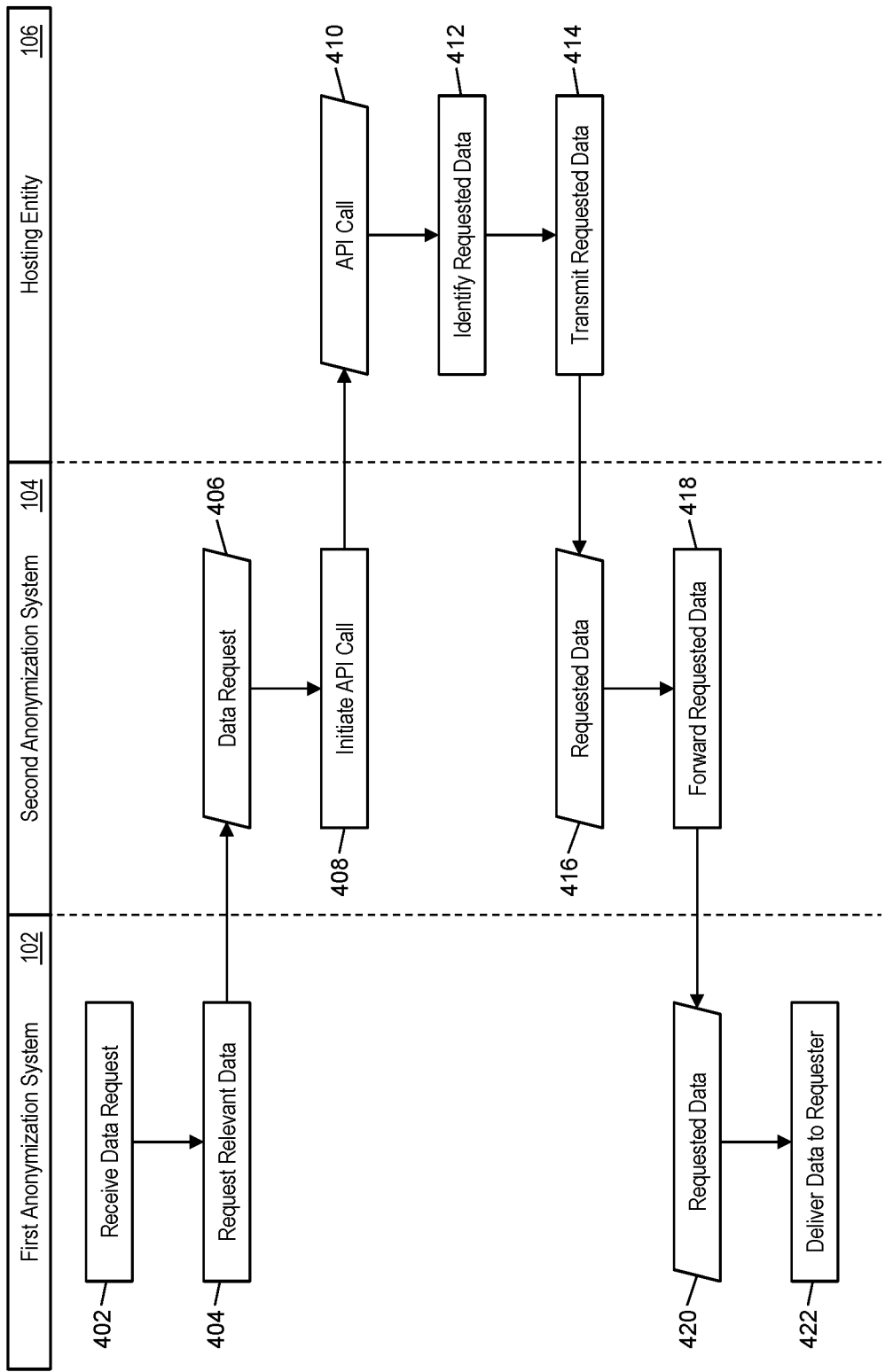
FIG. 4 is a flow diagram illustrating a process for the usage of double anonymized data using the system of FIG. 1 in accordance with exemplary embodiments.

FIG. 4 illustrates a process for the usage of double anonymized data in the system 100, where the double anonymized data is hosted by the hosting entity 106 and accessed via the first anonymization system 102 using the second anonymization system 104.

In step 402, a receiving device 202 of the first anonymization system 102 may receive a data request from a requesting entity 108. The data request may include at least one or more set identifiers, hashed identifiers, and/or data values that are being requested. For instance, the data request may include set identifiers or hashed identifiers for which stored data values are requested, or the data request may include one or more data values for which corresponding double-hashed identifiers are requested. In step 404, a transmitting device 214 of the first anonymization system 102 may request the relevant data from the second anonymization system 104. In instances where the data request may include set identifiers, a hashing module 210 of the first anonymization system 102 may first hash the set identifiers and replace the set identifiers with the hashed identifiers.

In step 406, a receiving device 202 of the second anonymization system 104 may receive the request from the first anonymization system 102 with the hashed identifiers and/or requested data values. In step 408, a transmitting device 214 of the second anonymization system 104 may initiate a call through the API of the hosting entity 106 to request data values corresponding to double-hashed identifiers (e.g., generated by the hashing module 210 if applicable) or to request double-hashed identifiers for specified data values provided in the data request. In step 410, the hosting entity 106 may receive the API call, requesting the double-hashed identifiers or data values.

In step 412, the hosting entity 106 may identify the requested data, such as identifying the data values for provided double-hashed identifiers or identifying double-hashed identifiers that correspond to data values requested via the API call. In some embodiments, a control layer of the hosting entity 106 may filter, aggregate, or otherwise process the data values as part of the identification thereof, such as based on rules applicable to the requested data values, corresponding double-anonymized data sets, the data sources, the requesting entity, etc. In step 414, the hosting entity 106 may transmit the identified data (e.g., aggregated, filtered, or otherwise processed) to the second anonymization system 104. In step 416, a receiving device 202 of the second anonymization system 104 may receive the identified data. In step 418, a transmitting device 214 of the second anonymization system 104 may forward the identified data to the first anonymization system 102, to be received by a receiving device 202 thereof, in step 420. In step 422, a transmitting device 214 of the first anonymization system 102 may transmit the identified data to the requesting entity 108 in response to the received data request. In some embodiments, step 422 may be performed by the second anonymization system 104, and steps 418 and 420 may not be performed.

Exemplary Method for the Double Anonymization of Data

Figure 5:
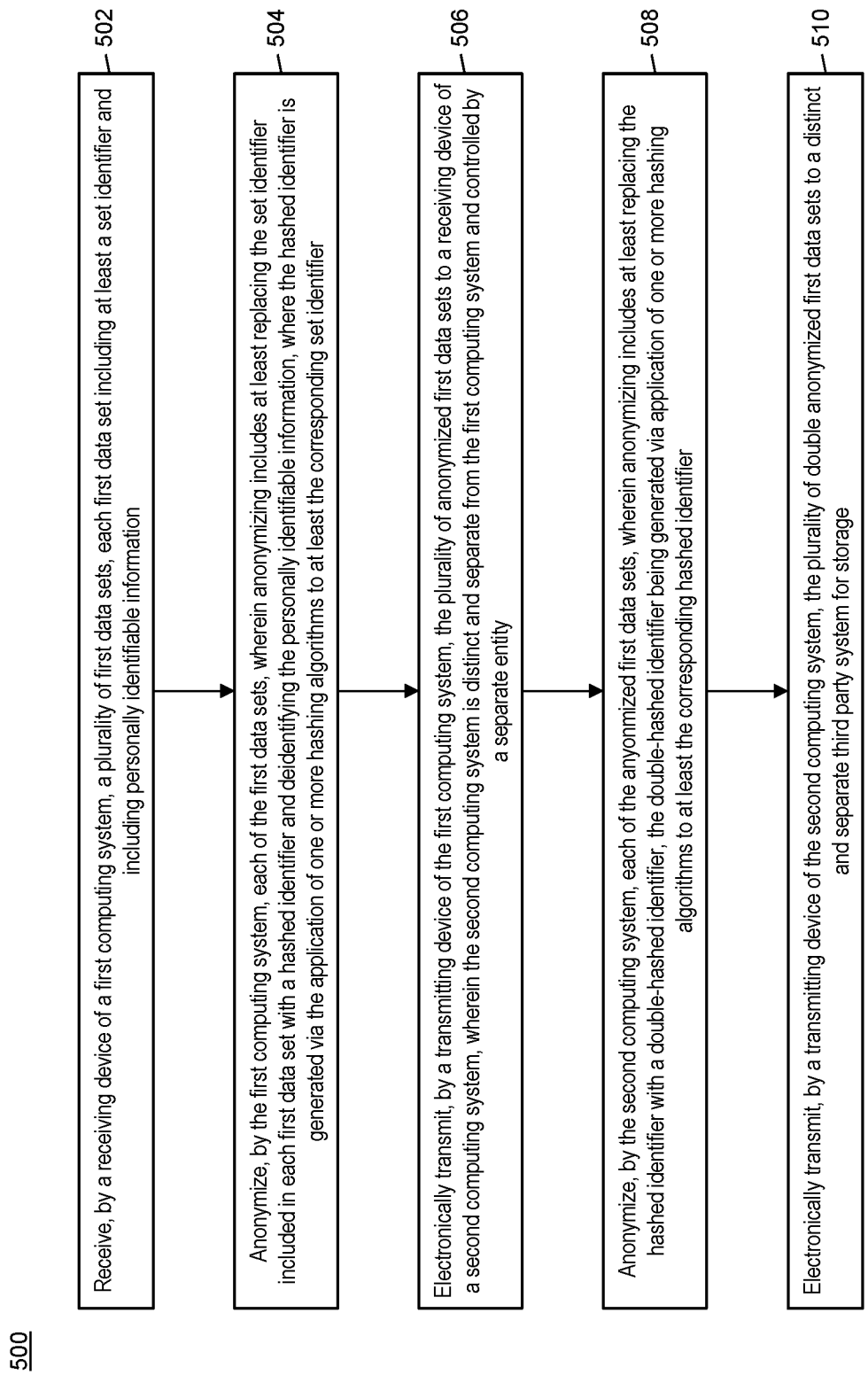
FIG. 5 is a flow chart illustrating an exemplary method for the double anonymization of data in accordance with exemplary embodiments.

FIG. 5 illustrates a method 500 for the double anonymization of data via the use of separate and distinct computing systems, each performing separate anonymization processes on data.

In step 502, a plurality of first data sets may be received by a receiving device (e.g., the receiving device 202) of a first computing system (e.g., the first anonymization system 102), where each first data set includes at least a set identifier and including personally identifiable information. In step 504, each of the first data sets may be anonymized by the first computing system, wherein anonymizing includes at least replacing the set identifier included in each first data set with a hashed identifier and deidentifying the personally identifiable information, where the hashed identifier is generated via the application of one or more hashing algorithms to at least the corresponding set identifier.

In step 506, the plurality of anonymized first data sets may be electronically transmitted by a transmitting device (e.g., the transmitting device 214) of the first computing system to a receiving device of a second computing system (e.g., the second anonymization system 104), wherein the second computing system is distinct and separate from the first computing system and controlled by a separate entity. In step 508, each of the anonymized first data sets may be anonymized by the second computing system, wherein anonymizing includes at least replacing the hashed identifier with a double-hashed identifier, the double-hashed identifier being generated via application of one or more hashing algorithms to at least the corresponding hashed identifier. In step 510, the plurality of double anonymized first data sets may be electronically transmitted by a transmitting device of the second computing system to a distinct and separate third party system (e.g., the hosting entity 106) for storage.

In one embodiment, the third party system may be controlled by a further separate entity from the first computing system and second computing system. In some embodiments, the second computing system may not receive or possess personally identifiable information. In one embodiment, the first computing system may be configured to discard the personally identifiable information subsequent to the deidentification. In some embodiments, the one or more hashing algorithms used by the first computing system and the second computing system may include at least one different hashing algorithm. In one embodiment, each first data set may include data related to an electronic payment transaction, the set identifier may be a primary account number used in the related electronic payment transaction, and the personally identifiable information may be comprised of the primary account number.

In some embodiments, the hashed identifier may be generated via the application of one or more hashing algorithms to the corresponding set identifier and a first salt value. In a further embodiment, the double-hashed identifier may be generated via application of one or more hashing algorithms to the corresponding hashed identifier and a second salt value. In another further embodiment, the one or more hashing algorithms used by the first computing system and the second computing system may be equivalent. In yet another further embodiment, the first computing system may not receive or possess the second salt value, and the second computing system may not receive or possess the first salt value.

Computer System Architecture

Figure 6:
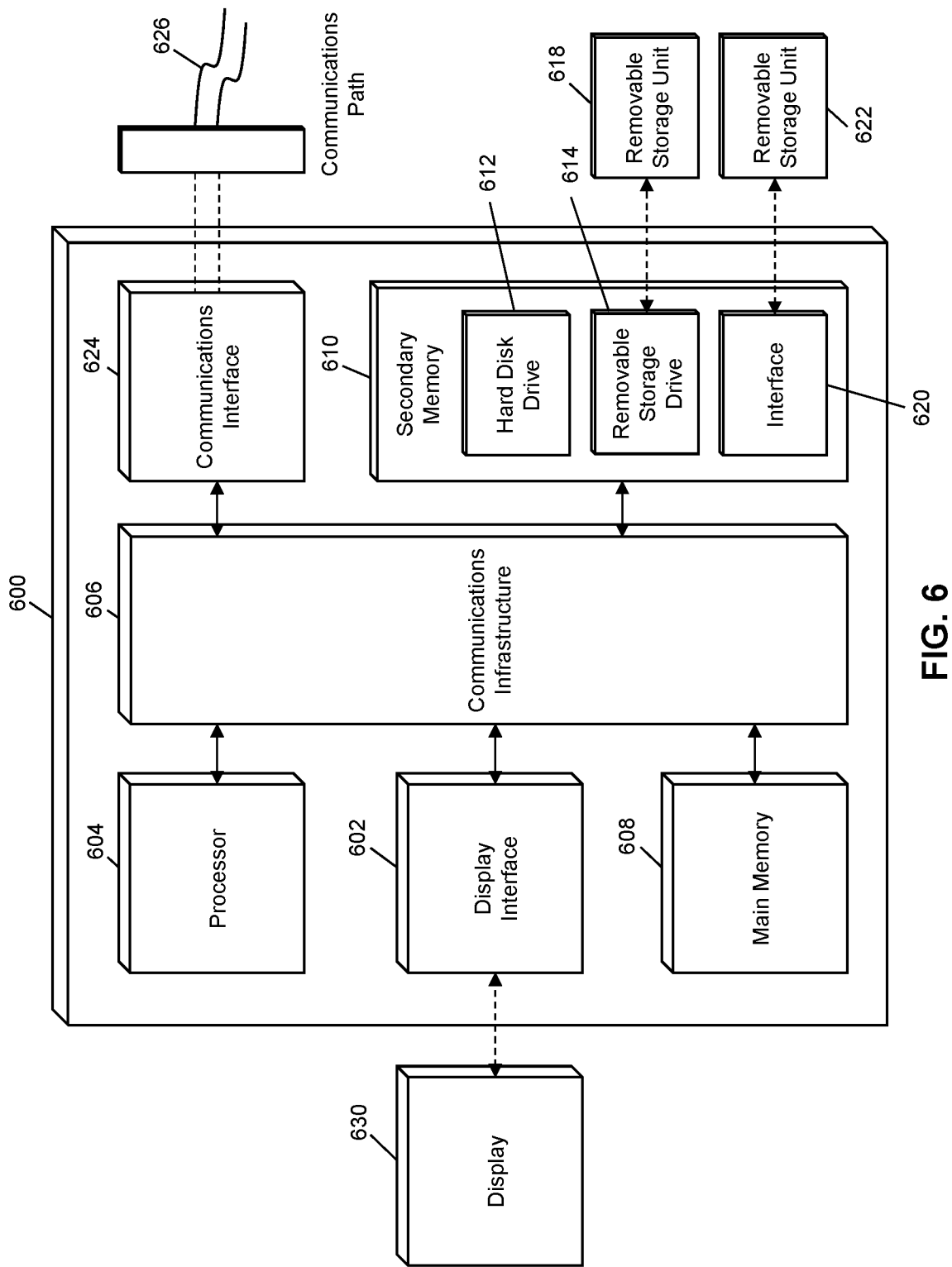
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 200 of FIG. 2 and/or computing systems that may comprise the first anonymization system 102 and/or second anonymization system 104 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for the double anonymization of data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for double anonymization of data, comprising:

receiving, by a receiving device of a first computing system, a plurality of first data sets, each first data set including at least a set identifier and including personally identifiable information, each first data set including data related to a transaction, each set identifier included in each first data set being an account number used in the related transaction, and the personally identifiable information included in each first data set comprising the related account number;

anonymizing, by the first computing system, each of the first data sets, wherein anonymizing includes at least replacing the set identifier included in each first data set with a hashed identifier and deidentifying the personally identifiable information, where the hashed identifier is generated via the application of one or more hashing algorithms to at least the corresponding set identifier;

electronically transmitting, by a transmitting device of the first computing system, the plurality of anonymized first data sets to a receiving device of a second computing system, wherein the second computing system is distinct and separate from the first computing system; and anonymizing, by the second computing system, each of the anonymized first data sets, wherein anonymizing includes at least replacing the hashed identifier with a double-hashed identifier, the double-hashed identifier being generated via application of one or more hashing algorithms to at least the corresponding hashed identifier, wherein the second computing system does not receive or possess the personally identifiable information, and wherein the hashed identifier is generated via the application of one or more hashing algorithms to the corresponding set identifier.

2. The method of claim 1, further comprising storing, in the second computing system or a third separate and distinct computing system, the plurality of double anonymized first data, wherein, if the double anonymized data sets are stored in the third computing system, the third computing system is controlled by a separate entity from the first computing system and second computing system, and if the double anonymized data sets are stored in the second computing system, the second computing system is controlled by a separate entity from the first computing system.

3. The method of claim 1, wherein the one or more hashing algorithms used by the first computing system and the second computing system include at least one different hashing algorithm.

4. The method of claim 1, wherein the hashed identifier is generated via the application of one or more hashing algorithms to the corresponding set identifier and a first salt value.

5. The method of claim 1, wherein the double-hashed identifier is generated via application of one or more hashing algorithms to the corresponding hashed identifier and a second salt value.

6. The method of claim 5, wherein the one or more hashing algorithms used by the first computing system and the second computing system are equivalent.

7. The method of claim 5, wherein
the first computing system does not receive or possess the second salt value, and
the second computing system does not receive or possess the first salt value.

8. A system for double anonymization of data, comprising:
a first computing system; and
a second computing system, wherein
first computing system is configured to
receive, by a receiving device of the first computing system, a plurality of first data sets, each first data set including at least a set identifier and including personally identifiable information, each first data set including data related to a transaction, each set identifier included in each first data set being an account number used in the related transaction, and the personally identifiable information included in each first data set comprising the related account number, anonymize each of the first data sets, wherein anonymizing includes at least replacing the set identifier included in each first data set with a hashed identifier and deidentifying the personally identifiable information, where the hashed identifier is generated via the application of one or more hashing algorithms to at least the corresponding set identifier, and electronically transmit, by a transmitting device of the first computing system, the plurality of anonymized first data sets to a receiving device of a second computing system, wherein the second computing system is distinct and separate from the first computing system, and the second computing system is configured to anonymize each of the anonymized first data sets, wherein anonymizing includes at least replacing the hashed identifier with a double-hashed identifier, the double-hashed identifier being generated via application of one or more hashing algorithms to at least the corresponding hashed identifier, wherein the second computing system does not receive or possess the personally identifiable information, and wherein the hashed identifier is generated via the application of one or more hashing algorithms to the corresponding set identifier.

9. The system of claim 8, wherein
the plurality of double anonymized first data sets is stored in the second computing system or in a distinct and separate third computing system, and
wherein if the double anonymized data sets are stored in the third computing system, the third computing system is controlled by a separate entity from the first computing system and second computing system, and
if the double anonymized data sets are stored in the second computing system, the second computing system is controlled by a separate entity from the first computing system.

10. The system of claim 8, wherein the one or more hashing algorithms used by the first computing system and the second computing system include at least one different hashing algorithm.

11. The system of claim 8, wherein the hashed identifier is generated via the application of one or more hashing algorithms to the corresponding set identifier and a first salt value.

12. The system of claim 5, wherein the double-hashed identifier is generated via application of one or more hashing algorithms to the corresponding hashed identifier and a second salt value.

13. The system of claim 12, wherein the one or more hashing algorithms used by the first computing system and the second computing system are equivalent.

14. The system of claim 12, wherein the first computing system does not receive or possess the second salt value, and the second computing system does not receive or possess the first salt value.

\* \* \* \* \*